Dec. 6, 1955
C. GOODMAN
2,726,338
METHOD OF LOCATING MATERIAL
Filed Oct. 18, 1951
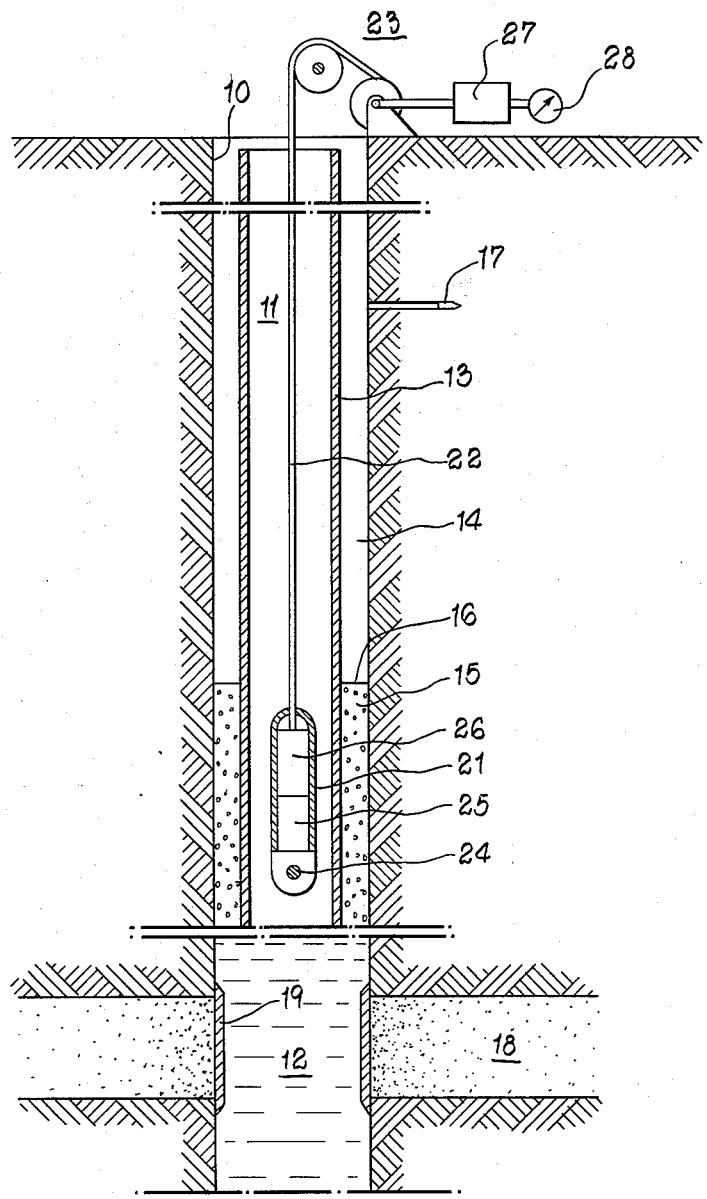
INVENTOR
CLARK GOODMAN
BY
ATTORNEYS

United States Patent Office 2,726,338
Patented Dec. 6, 1955

2,726,338

METHOD OF LOCATING MATERIAL

Clark Goodman, Boston, Mass., assignor to Schlumberger Well Surveying Corporation, Houston, Tex., a corporation of Delaware Application October 18, 1951, Serial No. 251,926

5 Claims. (Cl. 250—83.1)

The present invention relates to the location of a particular material in a mass of associated material and, more specifically, to a method of rendering the particular material distinctively responsive to radiation in contrast to the mass of material. The present invention finds one practical application in the determination of the position or extent of material in a bore hole, on the walls of a bore hole, or adjacent a bore hole in the formations traversed by the same.

It is a well-known procedure to incorporate radioisotopes or radioactive substances in a particular material in order to identify or trace the same in a mass of associated material by detecting the characteristic radioactive emission. Radioactive substances have previously been employed as tracers in bore hole operations. Such tracers have the advantage of being readily detectable under varied conditions, for example, in cased or uncased bore holes containing electrically conductive or non-conductive drilling liquids. The tracers may be very localized or may be widely dispersed. These favorable characteristics have been utilized to locate the level of cement behind a casing, to mark accurately a significant formation level, to determine the presence and the thickness of a mud cake, to indicate the degree or the speed of circulation of drilling liquids, and to effect many other useful determinations.

Radioactive tracers, however, suffer from several disadvantages. It is difficult or impossible to obtain an unambiguous radioactivity log of the formations in the vicinity of the radioactive tracing substance since such substance will, in general, obscure the natural or artificial radioactivity of the formations with a larger signal. Furthermore, a radioactive substance in sufficient concentration to be useful as a tracer may constitute a health hazard.

Accordingly, it is an object of the present invention to locate a particular material in a mass of associated material by employing a tracing substance which is distinctively responsive to radioactvity but which is neither naturally nor artificially continuously radioactive.

It is a further object of the invention to identify or locate a particular material by incorporating with the same a substance which may be induced at will to emit neutron radiation.

In accordance with the present invention the presence, position, or extent of a particular material in a mass of associated material is determined by incorporating with the particular material a substance which may be induced to emit neutrons. The mass of material is irradiated with radiation of sufficient energy to induce neutron radiation from the substance but of insufficient energy to induce neutron radiation from the remainder of the mass of material. The neutron radiation from the irradiated mass of material is then detected and serves to locate the particular material.

More specifically, the invention contemplates employing a substance which may be induced to emit photoneutrons, and the mass of material is irradiated with gamma rays of sufficient energy to cause photodisintegration in the substance but of insufficient energy to cause photodisintegration in the rest of the material. Under these conditions any photoneutrons which are detected must originate in the substance and thus serve to identify or, in effect to label the particular material which is mixed, buried, or otherwise closely associated with the mass of material. The particular material may comprise, for example, cement, mud cake or a metallic member, and the mass of material may be the formations traversed by a bore hole or the liquid in which drilling mud is suspended.

The substance which serves as a source of photoneutrons may have any chemical form and may be incorporated in the particular material as an inexpensive and readily available compound since the yield of photoneutrons depends only upon the nuclear properties of the elements from which the compound is formed. Photoneutrons are produced by the direct interaction of a high-energy photon and a nucleus in a reaction called "photo-disintegration." A photodisintegration occurs only when the bombarding photon, for example, a gamma ray, has an energy greater than some sharply defined threshold level. Accordingly, the photoneutron source substance is chosen on the basis of its low nuclear binding energy in order that the first neutrons to be emitted will emanate from the photoneutron source substance. A further factor in the choice of a photoneutron source substance is its relative freedom from chemical reaction in the mass of material. For example, a chemical reaction of an inappropriately selected photoneutron source substance in the formations traversed by a bore hole might adversely affect the subsequent electrical logging of the bore hole. Having these considerations in mind, beryllium is the preferred photoneutron source substance, and deuterium is another possible substance.

The source of gamma rays is correlated with the choice of the photoneutron source substance in order that the rays have only slightly higher energy than that required to photodisintegrate the substance. This will ensure that the nuclei of other elements contained in the mass of material will not be photodisintegrated and obscure the indication of the particular material in which the photoneutron source substance is incorporated.

In order that the invention may be more fully understood it will now be described with reference to the accompanying drawing wherein the single figure illustrates the use of the inventive method in bore hole operations.

Referring now to the figure, a bore hole 10 is shown in longitudinal section traversing earth formations. In order to illustrate conveniently several applications of the present method, the bore hole 10 is shown with an upper cased portion 11 and a lower uncased portion 12. In the upper portion 11 a space 14 between a metallic casing 13 and the wall of the bore hole 10 has been partially filled with cement 15 as high as an upper level 16. A specific employment for the present method is in the detection of the position of the upper level 16 of the cement 15 in order to determine whether sufficient cement has been pumped into the space 14 to seal off a desired section of the wall of the bore hole, for example, the section opposite a waterbearing formation.

Another use for the present inventive method is in the location of a bullet 17 which may have been projected into a formation surrounding the bore hole 10 before the casing 13 was placed in position. The position of such a bullet is often correlated with an electrical log. Once the casing 13 is in place electrical logging methods are no longer available, and it is desirable to be able to relocate the bullet 17 despite the interposition of the casing 13.

A still further example of a use for the inventive method is in the location of permeable formations. In the usual rotary drilling practice as a bore hole is being drilled into the earth it at all times contains drilling liquid of such weight that the pressure of liquid against any formation is greater than the fluid pressure within the formation. In order to prevent "blow-outs" such drilling liquids usually comprise finely divided particles suspended in a liquid medium. Since the hydrostatic pressure of the column of drilling liquid is greater than the fluid pressure within formations at the same level, filtrate from the suspension will flow into any permeable formations traversed by the bore hole. However, these permeable formations will screen out the particles in the liquid with the result that a mud cake will form on the wall of the bore hole at the level of such formations. Accordingly, a permeable formation 18 in the lower uncased portion 12 of the bore hole 10 is covered by a mud cake 19 where it is traversed by the bore hole 10.

The first step in the present method, as applied to the above-discussed bore hole problems, is to include a photoneutron source substance, such as beryllium or a compound thereof in the particular material that is to be located among the formations comprising the wall of the bore hole 10. Thus a photoneutron source substance in the form of, say beryllium silicate is dispersed throughout the cement 15 before it is pumped into the space 14 in the bore hole 10. The bullet 17 also contains this photoneutron source substance. For example, it may be made from a beryllium alloy or have a beryllium copper jacket. Likewise, the drilling mud contains a photoneutron source substance, such as beryllium silicate, which is filtered out as part of the mud cake 19. The amount of the photoneutron source substance in the mud cake 19 will be directly proportional to the thickness of the mud cake.

The next step is to progressively irradiate overlapping sections of the wall of the bore hole 10 with gamma rays of slightly higher energy than the threshold energy associated with the photoneutron source substance. Finally photoneutrons are detected in the bore hole and their numerical frequency indicated as a measure of the presence and concentration of the photoneutron source substance. This indication is correlated with the level in the bore hole 10 at which the photoneutrons are received.

Simple apparatus for carrying out this method may comprise, for example, a pressure-resistant housing 21 which is raised and lowered on a multiple conductor cable 22 by means of a winch 23. A source 24 of gamma rays is contained within the housing 21 which also encloses a neutron detector 25 together with a high voltage supply and pulse amplifier 26. The cable 22 carries electrical conductors connecting the high voltage supply and pulse amplifier 26 to a power supply and indicator amplifier 27 on the surface of the earth. A meter 28 associated with the amplifier 27 indicates the quantity of the neutrons received by the detector 25 per unit of time. Preferably the meter 28 records the intensity of the induced neutron radiation as a function of the level of the housing 21 in the bore hole 10.

In operation the quantity of detected photoneutrons will increase abruptly opposite the mud cake 19 as the housing 21 passes the formation 18. As a result of the great penetrating power of neutrons, the casing 13 will not prevent the reception of a relatively constant quantity of neutrons opposite the cement 15. The induced neutron radiation will decrease abruptly as the detector 25 passes above the upper level 16 of the cement 15. As the housing is continued to be raised a burst of neutrons will be indicated opposite bullet 17.

Beryllium is the preferred photoneutron source material inasmuch as it has a photodisintegration threshold of 1.66 million electron volts, which is the lowest threshold of any of the elements. Deuterium possesses the next highest photodisintegration threshold at 2.23 million electron volts, and may be employed as the photoneutron source if desired.

By proper selection of the source 24 of gamma rays, one may be certain that the neutrons detected by the detector 25 originate in beryllium nuclei. If there is any possibility that the formations contain appreciable amounts of a beryllium compound, a control log can be run before incorporating any beryllium with the particular material that it is desired to locate. Suitable sources of gamma rays having energies sufficiently high to photodisintegrate beryllium are, for example, antimony-124, chlorine-38, scandium-44, zinc-63 and indium-116. These radioactive isotopes emit no neutrons and are currently available for industrial applications from the United States Atomic Energy Commission.

In general the present method may be employed whereever radioactive tracers have previously been used in bore hole operations. Many other uses for the basic inventive method will undoubtedly occur to one skilled in the art wherever the mass of material in which the particular material is to be located is not deleteriously affected by irradiation with gamma rays of moderate energy level. For example, a small non-magnetic object that contains a beryllium compound may, if lost, be recovered by searching the area within which it was lost with a suitable source of gamma rays and a neutron detector. Accordingly, the appended claims are not to be construed as limited to the particular uses of the invention which have been illustrated nor, in fact, as restricted to bore hole operations.

I claim:

1. A method of locating a particular material in a mass of associated material comprising incorporating with the particular material nuclei of a predetermined element requiring less threshold energy for photodisintegration than the threshold energies required to photodisintegrate nuclei of the elements in the mass of material, irradiating the mass of material with gamma rays of slightly higher energy than the threshold energy associated with said predetermined element but of lower energy than the threshold energies associated with the elements in the mass of material and detecting the photoneutrons received from the irradiated mass of material as an indication of the presence of the particular material.

2. A method of locating a particular material in a mass of associated material comprising incorporating beryllium neuclei with the particular material, irradiating the mass of material with gamma rays having an energy level in excess of about 1.66 million electron volts to photodistintegrate a beryllium nucleus and release a photoneutron therefrom but of insufficient strength to photodistintegrate nuclei of elements requiring greater threshold energy to release a neutron therefrom, and converting the photoneutrons received from the irradiated mass of material to a sensible indication of the presence of the particular material.

3. A method of locating a particular material in a mass of associated material comprising incorporating deuterons with the particular material, irradiating the mass of material with gamma rays having an energy level in excess of about 2.23 million electron volts to photodisintegrate a deuteron and release a photoneutron therefrom but of insufficient strength to photodisintegrate nuclei of elements requiring greater threshold energy to release a neutron therefrom, and converting the photoneutrons received from the irradiated mass of material to a sensible indication of the presence of the particular material.

4. A method of logging a bore hole to locate nuclei of a particular element comprising irradiating successive portions of the bore hole wall with gamma rays having slightly higher energy than the threshold energy required to photodisintegrate a nucleus of said particular element but having lower energy than the threshold energies associated with the other elements the presence of which is anticipated adjacent the bore hole, and simultaneously detecting photoneutrons received in the bore hole as an indication of the presence of said particular element.

5. A method of logging a bore hole to locate beryllium neuclei comprising irradiating successive portions of the bore hole wall with gamma rays having slightly higher energy than the threshold energy required to photodisintegrate a beryllium nucleus but having lower energy than the threshold energies associated with the other elements the presence of which is anticipated adjacent the bore hole, and simultaneously detecting photoneutrons received in the bore hole as an indication of the presence of the beryllium nuclei.

References Cited in the file of this patent

UNITED STATES PATENTS

| | | |
|---|---|---|
| 2,345,119 | Hare | Mar. 28, 1945 |
| 2,398,324 | Pontocorvo | Apr. 9, 1946 |
| 2,484,422 | Muskat | Oct. 11, 1949 |

OTHER REFERENCES

Sourcebook on Atomic Energy, by Samuel Glasstone, published by D. Van Nostrand Co., Copyright 1950, page 256, paragraph 10.45.